June 14, 1960

R. A. WILLIAMS 2,941,131

SEMICONDUCTIVE APPARATUS

Filed May 13, 1955

INVENTOR.
RICHARD A. WILLIAMS
BY
Dean V. Hazeltine
ATTORNEY 2,941,131

SEMICONDUCTIVE APPARATUS

Richard A. Williams, Collingswood, N.J., assignor to Philco Corporation, Philadelphia, Pa., a corporation of Pennsylvania Filed May 13, 1955, Ser. No. 508,262

7 Claims. (Cl. 317—235)

The present invention relates to semiconductive signal-translating apparatus, and particularly to signal-amplifying devices of the transistor type.

In the past, semiconductive amplifying devices have been utilized which employ a pair of confronting, substantially plane-parallel rectifying potential-barriers of substantial area as minority-carrier emitter and collector elements, and an intervening region of semiconductive material which serves as the base element. In the surface-barrier transistor, described in detail in the copending application Serial No. 472,826 of R. A. Williams and J. W. Tiley for "Electrical Device," filed December 3, 1954, and of common assignee, now Patent No. 2,885,571, such barriers are produced by metal-to-semiconductor area contacts, while in the junction transistor they are produced by transitions in the conductivity type of the semiconductive material. In connection with the fabrication of such prior art devices, much effort has been expended in obtaining emitter and collector elements which are as nearly plane-parallel as possible, to improve the high-frequency performance of the devices by minimizing transit-time dispersion of the minority-carriers, as well as for the other reasons. While such efforts have led to transistors operable at relatively high frequencies, operation at still higher frequencies is desirable for many important applications. It is also desirable to increase the amplification obtainable with transistor devices at any frequency.

Accordingly, it is an object of my invention to provide a new and improved type of semiconductive signal-translating device.

Another object is to provide such a device which is capable of providing amplification at unusually high frequencies.

Still another object is to provide a new type of transistor which may be operated to provide increased amplification.

A further object is to provide a transistor which may be operated at unusually high frequencies and yet is mechanically and chemically stable.

A still further object is to provide a transistor oscillator or amplifier operable at unusually high frequencies.

The above objectives are achieved, in accordance with the invention, by providing a transistor which, in contradistinction to the teachings of the prior art, comprises area emitter and collector elements which depart from parallelism to a high degree in the active regions of minority-carrier emission and collection, in such manner that the spacing through the bulk of the semiconductive base between collector and emitter is a rapidly-changing, increasing function of position in the vicinity of the minimum in said spacing. Typically, the emitter and collector may present sharply convex areas each to the other, and extend over an area relatively large compared to the area of the region of closest approach. Further in accordance with the invention in one aspect, the minimum spacing between emitter and collector is preferably very small, e.g. less than about 0.2 mil, and the radius of curvature of at least either the emitter or collector at the point of minimum spacing is preferably no more than about 100 times the minimum spacing.

With this transistor structure, amplification at exceedingly high frequencies may be obtained through operation in any one of several possible modes. First, when operated in the normal mode in which the space-charge regions adjacent the emitter and collector are spaced from each other and the voltage applied to the collector is such as to bias the collector in the normal saturation range, the device may be used as an amplifier or oscillator at extremely high frequencies, primarily because of the low value of high-frequency base resistance obtained with this geometry. In this case the minimum spacing of emitter and collector is preferably less than about 0.2 mil, in one preferred embodiment being of the order of 0.05 mil. I have found that, with such spacings, minority-carrier transit time dispersion is no longer the sole factor limiting high frequency amplification, but rather that the high-frequency base resistance $r_b'$ and the collector capacitance $C_c$ of the transistor also affect importantly the maximum frequency at which gain can be obtained. By utilizing emitter and collector of the highly curved geometry mentioned hereinbefore, the usually-narrow region of the base between emitter and collector through which most of the current flow occurs, is caused to communicate more directly and more readily with external portions of the bulk semiconductor, and the base electrode is therefore better able to exert high frequency control upon the current of minority-carriers flowing from emitter to collector. This condition produces a reduction in the high-frequency base resistance $r_b'$ of the transistor, thereby improving the high-frequency amplification. With the close minimum spacings preferably utilized in this embodiment, most of the minority-carrier current is confined to the regions of minimum spacing, and any increase in transit-time dispersion which may result from non-parallelism of emitter and collector is therefore of less importance in determining high frequency amplification than the reduction of high-frequency base resistance thus produced, and a net improvement in high frequency amplification is therefore obtained.

Further I have found that the transistor described herein is also particularly advantageous when operated in a mode in which the collector is biased sufficiently strongly in the reverse direction to produce avalanches of secondary electrons in the bulk of the semiconductive material, increasing the current gain of the device and hence the maximum oscillating frequency. With appropriate biasing such avalanching may be caused to provide a negative resistance between collector and emitter electrodes which makes possible unusually strong high-frequency oscillations, and with my novel construction the device is stable electrically, mechanically and chemically.

The transistor of the invention has also been found to permit extremely high frequency operation in a new mode, hereinafter referred to as the "punch-through" mode, in which the device is biased so that the space-charge regions of emitter and collector extend through the body of intervening semiconductive material so as to meet at at least one point. This mode of operation is described in detail in the copending application Serial No. 511,533 of R. J. Turner, entitled Electrical Apparatus and Method, filed May 27, 1955, and of common assignee. In this mode of operation the minority-carriers flow from emitter to collector through the region of merging of the two depletion regions with extremely high velocity, impelled by the high electric field there existing. The transit-time for minority-carriers under such conditions of field-controlled flow is much shorter than in the usual mode in which diffusion due to a concentration gradient of minority-carriers is the primary motivating force. With the highly-curved geometry of my novel transistor, the depletion regions adjacent emitter and collector are so shaped that the potential of the base can exert control upon the current in the punched-through region and amplification is obtained for very high frequencies.

Other objects and features of the invention will be more readily understood from a consideration of the following detailed description, in connection with the accompanying drawings, in which.

Figure 1A:
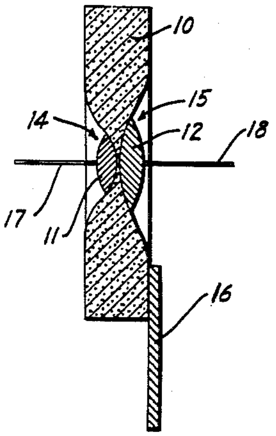
Figures 1A and 1B are sectional and plan views, respectively, of a semiconductive signal-translating device embodying the invention.
Figure 1B:
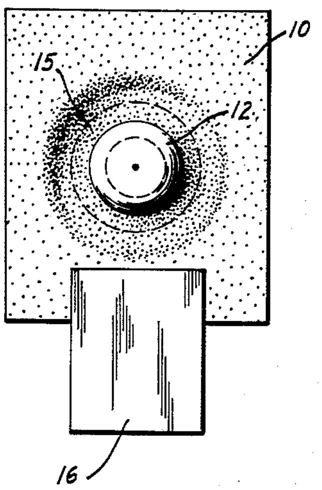

Referring now to Figures 1A and 1B, wherein like numerals denote like parts, the transistor there shown is of the general class known as surface-barrier transistors described fully in the above-mentioned copending application Serial No. 472,826, and the details of its general construction and mode of operation therefore need not be set forth herein. Similarly, general principles and techniques for fabricating transistors of this general class are described in the copending application Serial No. 472,824 of J. W. Tiley and R. A. Williams, filed December 3, 1954, for "Semiconductive Devices and Methods for the Fabrication Thereof," and hence are not described in detail herein.

The transistor of Figures 1A and 1B comprises generally a body 10 of semiconductive material suitable as a transistor base into which minority-carriers may be injected by an emitter electrode 11, and from which they may be extracted by a collector electrode 12. Each electrode is in intimate, substantially stressless area contact with body 10. Emitter and collector electrodes 11 and 12 are in this case situated upon directly opposing surfaces of body 10, and located within a pair of corresponding, curved depressions 14 and 15 so as to be very closely spaced in their region of closest approach. A metallic base tab 16, soldered to base 10, may provide substantially ohmic contact to the base, and filamentary emitter and collector contacting leads 17 and 18 may be applied to the emitter and collector electrodes respectively, by spring-contact or soldering for example, to facilitate connection to external elements.

Semiconductive body 10 may typically be of germanium or silicon, although other materials may also be used, and emitter and collector electrodes 11 and 12 are constituted and applied in accordance with the teachings of the above-mentioned copending application Serial No. 472,826, so as to provide contacts of the rectifying type, and, at least in the case of the emitter electrode, a contact which is preferably capable of efficient injection of minority-carriers into base 10. One suitable metal for use on N-type germanium is indium.

In accordance with the invention, the emitter and collector elements are highly curved, in the vicinity of the region of closest approach, in a direction such that the spacing between them increases relatively rapidly as a function of position on either side of the minimum in spacing. One preferred geometry for the confronting areas of emitter and collector electrodes is shown more clearly in the enlarged view of Figure 2, wherein dimension *a* indicates the minimum spacing between emitter and collector, dimension *b* indicates the maximum spacing, and *c* indicates the distance from the center of the emitter contact to one edge thereof. In one typical embodiment utilizing N-type germanium of about 0.1 ohm-centimeter resistivity as the base material, and electrodeposited indium electrodes as emitter and collector, the minimum spacing *a* may be approximately 0.05 mil, the maximum separation *b* about 0.5 mil, and the radius of the emitter *c* about 1 mil. In this case the spacing between emitter and collector increases ten-fold in passing from the center of the contact to the edge of the emitter. Both the emitter and collector areas are in this case substantially spheroidal in form, the emitter having a radius of curvature of approximately 2 mils and the collector a radius of curvature of approximately 4 mils. With this shape, not only does the spacing increase markedly as described, but the incease in spacing begins substantially at the center of the emitter, so that substantially only a single point on the emitter lies precisely parallel to the opposing collector area and possesses the minimum value of spacing. Although there is a small region extending about a quarter of a mil on either side of the point of minimum spacing for which the spacing is not more than about 50% greater than the minimum value, by far the greater portion of the area of the emitter contact is spaced from the collector by from two to ten times the minimum spacing.

With the above described geometry, there is provided a region of very close spacing between emitter and collector at the central portions thereof, by virtue of which very short transit times are obtained in the normal mode of operation. Since the close proximity of the collector to the emitter produces a much stronger diffusion field in the region of minimum spacing, most of the minority-carrier current is confined substantially to the central region. However, since the spacing between emitter and collector begins to increase substantially even upon small lateral departures from the region of minimum spacing, the resistance presented to base currents flowing into the central region is much less than in prior art arrangements, in which a large part of the current-carrying area of emitter and collector is substantially isolated from the external base connection by a narrow slit of semiconductive material providing a relatively large series resistance and shunt capacity and producing large values of high-frequency base resistance $r_b'$. With the construction of the invention, the region of rapid transit time at the center of emitter and collector is therefore exposed to effective control by the external base electrode due to the rapid divergence between emitter and collector in the vicinity of the region of minimum spacing.

Figure 3:
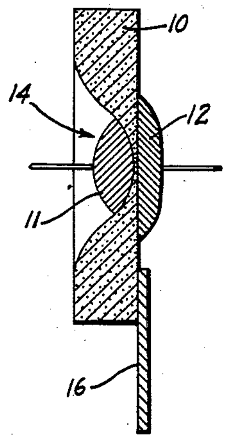
Figures 3 and 4 are sectional views of other forms of transistors embodying the invention.

Although greater rates of divergence between emitter and collector are more readily obtainable by utilizing curvature of both emitter and collector, nevertheless effects similar to those described above may be obtained by providing sufficiently high curvature for one of the elements such as the emitter, and by utilizing a collector area which is substantially flat or slightly curved in either the concave or convex directions. Such an embodiment of the invention is shown in Figure 3, wherein like numerals denote like elements, and in which collector electrode 12 is applied to a substantially flat surface of semiconductive body 10, while emitter electrode 11 is applied to the bottom of a depression 14 which approaches closely to the surface contacted by the collector and has a highly curved portion at least in the vicinity of the minimum in spacing.

Figure 4:
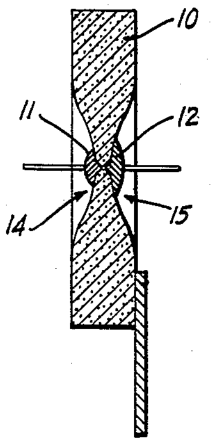

Figure 4 illustrates another embodiment of the invention, in which the configuration of the opposing surfaces of the semiconductive body 10 is such as to provide a substantially higher radius of curvature in the immediate vicinity of the minimum in spacing between emitter and collector than elsewhere in the area of contact. Thus each of the depressions 14 and 15 may be composed of two portions, one an outer, substantially spheroidal pit of relatively large radius of curvature, and the other a smaller-diameter pit at the bottom of the larger depression having a much smaller radius of curvature, as shown. The resultant pair of opposed, mammiloid depressions are then provided with emitter and collector electrodes 11 and 12 which cover both the pits of smaller radius of curvature and, to some extent, the adjoining portions of the larger-radius pits. This configuration is readily provided, by the jet techniques referred to hereinbefore, by utilizing first a relatively large diameter jet to provide the larger-diameter portion of the depression, and then a smaller diameter jet to provide the small additional indentation at the center of the bottom of the large depression.

It will be appreciated that in each of the foregoing examples there is provided, for at least either the emitter or collector element, a relatively small region in the immediate vicinity of the minimum spacing which is the active region so far as injection and collection of minority-carriers are concerned, which is very closely spaced from the other element, and which, because this region is surrounded on all sides not by the semiconductor surface but by a contact of fixed nature, is not highly sensitive to variations in the nature of the surface of the semiconductor which are well known to occur in many applications. This feature is of particular significance in operation in the avalanche mode, since avalanching at the exposed surface of a semiconductive body has been found to result in the generation of substantial amounts of undesired electrical noise which the present construction avoids.

Figure 5:
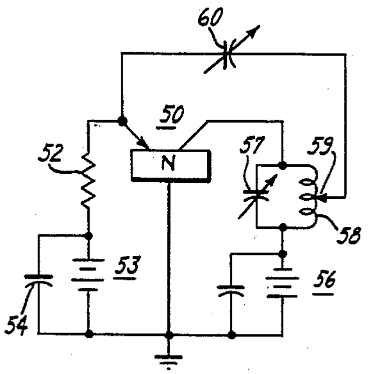
Figure 5 is a schematic diagram showing circuit apparatus for operating my novel transistor as an oscillator in the normal mode, in the avalanche mode, or in the "punch-through" mode referred to hereinbefore.

Figure 5 shows one typical oscillator circuit in which my novel form of transistor may be utilized. The transistor 50 is constructed in accordance with the invention as described hereinbefore, and is operated in this case with its base grounded directly and its emitter connected to ground by way of emitter resistor 52 and biasing battery 53, the latter being bypassed by capacitor 54 and, as shown, in the polarity to bias the emitter in the forward direction. The collector is connected to a source 56 of negative bias potential $V_{cc}$ by way of a tuned circuit comprising a variable capacitor 57 in parallel with a variably-tapped inductor 58, and positive feedback from the variable tap 59 to the emitter is provided by variable capacitor 60.

The frequency of oscillation of the circuit of Figure 5 may be controlled by variation of capacitor 57, and capacitor 60 and the position of tap 59 may be adjusted to obtain an optimum combination of feedback and impedance matching between collector and emitter for best loop gain. Under these conditions the maximum frequency of oscillation is unusually high, the exact value for any given transistor depending in general upon the magnitude of the collector voltage $V_{cc}$. When $V_{cc}$ is relatively small, the transistor operates in the normal mode in which the emitter and collector space charge regions are completely separate and electron-avalanching is negligible. Oscillation frequencies of at least several hundred megacycles/second may be obtained with a transistor of the form described herein in this normal mode.

When the collector voltage $V_{cc}$ is increased sufficiently, operation in either or both of the avalanche and "punch-through" modes may be obtained, producing even higher oscillation frequencies. When the resistivity of the base of transistor 50 is sufficiently low so that large fields are produced within the base for relatively small collector potentials, and the collector space-charge region is relatively thin, secondary-electron avalanching may be produced before punch-through between emitter and collector occurs, with resultant increases in the alpha of the transistor. With the form of transistor described herein, operation in this mode has been found to occur at collector voltages which are not excessively high, and to be sufficiently stable and controllable for many purposes, including oscillator and switching applications. When the emitter and collector are sufficiently close together, the application of relatively high potentials to the collector will produce punch-through between emitter and collector, resulting in relatively heavy collector currents. With the sharply-curved electrodes of my transistor, the current at punch-through is controllable by the base potential and permits amplification at unusually high frequencies, due principally to the extremely rapid transit-time of minority-carriers in the base material, as described in the above-cited copending application of Turner.

Figure 2:
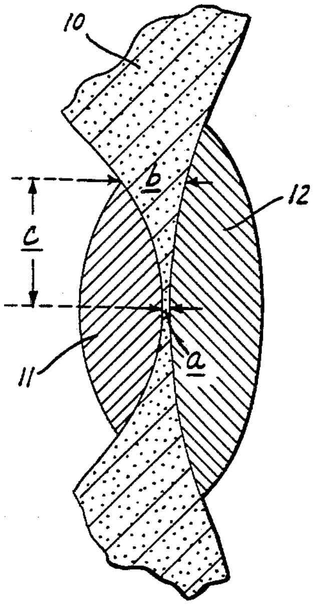
Figure 2 is an enlarged, fragmentary view of a portion of the device of Figure 1A, shown in section.

While it is not intended to limit the scope of the invention, specific values for the transistor 50 and the circuit associated therewith may be approximately as follows, utilizing the general geometry shown in Figure 2:

| | |
|---|---|
| Diameter of emitter | 2 mils. |
| Diameter of collector | 4 mils. |
| Minimum spacing between emitter and collector | 0.05 mil. |
| Semiconductive material | N-type Ge, 0.1 ohm-centimeter resistivity. |
| Emitter resistor **52** | 10,000 ohms. |
| Emitter bias source **53** | 10 volts. |
| Bypass resistor **54** | 1,000 micromicrofarads. |
| Capacitor **57** | 1.5–7 micromicrofarads. |
| Inductor **58** | 100 microhenries. |
| Capacitor **60** | 4–30 micromicrofarads. |
| Capacitor **61** | 1,000 micromicrofarads. |

Utilizing these values, and with a collector supply voltage $V_{cc}$ of about $-3$ volts producing a collector current of about 0.5 mil, the transistor may typically exhibit an alpha of about 0.69 and a maximum frequency of oscillation of about 190 megacycles/second. When the collector voltage is increased to about $-6$ volts, the alpha may typically rise to about 0.85, and the maximum oscillating frequency to more than 250 megacycles/second. It will be understood, however, that these do not represent the highest frequencies obtainable with such arrangements, maximum oscillating frequencies of more than 250 megacycles/second having been obtained in some instances in the normal mode, and substantially higher frequencies for modes using higher values of collector potential.

Although the invention has been described with particular reference to specific embodiments, it will be appreciated that it may also be practiced in any of a large variety of forms without departing from the scope of the invention. For example, although the transistor shown and described in detail utilizes a surface-barrier emitter and collector, it is also possible to obtain similar results if either or both of the electrodes are composed of a metal suitable for converting the base material to the opposite conductivity material when alloyed therewith, and by then heating the asembly slightly to produce such alloying. Although the precise control of the geometry possible with the surface-barrier electrode is then not fully realized, nevertheless satisfactory results may be obtained. Furthermore, although the specific examples given have been for the case of an N-type body of base material, similar results may be obtained when the transistor is of a type having a P-type base, when the bias voltages are appropriately reversed in a manner which will be apparent to those skilled in the art. It is also possible to produce not only a single minimum spacing, but a multiplicity of such spacings, by appropriately configuring the surface of the semiconductor as by the jet techniques referred to hereinbefore, and then plating an appropriate metal upon the so-shaped surface. The transistor shown may also be utilized not only in an oscillator circuit as shown in detail, but also as an amplifier of higher or lower frequency signals or as a video frequency amplifier.

I claim:

1. A semiconductive signal-translating device comprising a body of semiconductive material, an area emitter element and an opposing collector element, at least one of said elements having substantially higher curvature in the vicinity of its point of closest approach to the other of said elements than at other points thereof and being substantially mammaloid in form.

2. A semiconductive signal-translating device comprising a body of semiconductive material, an area emitter element formed in one surface of said body and an area collector element formed in an opposite surface of said body, the opposed surfaces of said area elements being non-uniformly spaced from each other, the surface of at least one of said area elements having a curvature in the vicinity of its minimum spacing from the other of said elements which is greater than that of adjacent portions of said surface.

3. A semiconductive signal-translating device comprising a body of semiconductive material, an area emitter element and an opposed area collector element non-uniformly spaced from said emitter element, the maximum spacing between said emitter and collector elements being at least about ten times greater than the minimum spacing between said elements.

4. The device of claim 3, in which said minimum spacing is less than about 0.2 mil.

5. The device of claim 3, in which said minimum spacing is about 0.05 mil.

6. A semiconductive signal-translating device comprising a body of semiconductive material, an area emitter element and an opposing concentric area collector element, each of said elements being contiguous with said body, at least one of said elements having a central zone of small radius of curvature closely-spaced from the other of said elements and having a peripheral zone spaced farther from said other element and of an area and a radius of curvature each many times greater than the respective area and radius of curvature of said first zone.

7. A semiconductor signal-translating device comprising a body of crystalline semiconductive material having a resistivity of the order of a tenth of an ohm-centimeter, an area emitter element and an opposed area collector element, each of said elements having surfaces contiguous with said body and generally convex toward the other of said elements, said elements having a minimum mutual spacing of the order of a few hundredths of a mil, the radius of curvature of each of said elements at said minimum of spacing being less than about one-hundred times said minimum spacing, the mutual spacing of said elements at their peripheries being at least about ten times said minimum spacing.

References Cited in the file of this patent

UNITED STATES PATENTS

| | | |
|---|---|---|
| 2,701,326 | Pfann | Feb. 1, 1955 |
| 2,725,505 | Webster | Nov. 29, 1955 |
| 2,742,383 | Barnes et al. | Apr. 17, 1956 |
| 2,759,133 | Mueller | Aug. 14, 1956 |
| 2,764,642 | Shockley | Sept. 25, 1956 |
| 2,765,516 | Haegele | Oct. 9, 1956 |
| 2,790,034 | McAfee | Apr. 23, 1957 |
| 2,833,969 | Christian | May 6, 1958 |

FOREIGN PATENTS

| | | |
|---|---|---|
| 1,038,658 | France | May 13, 1953 |
| 1,078,688 | France | May 12, 1954 |
| 1,080,034 | France | May 26, 1954 |

OTHER REFERENCES

Publication I, "Voltage Punch Though . . ." in Proc. of Nat. Elec. Conference, vol. 10, pages 614–625.